United States Patent

Beneck et al.

[11] Patent Number: 4,731,219
[45] Date of Patent: Mar. 15, 1988

[54] METHOD AND APPARATUS FOR COMPACTING A BUNDLE OF FUEL ELEMENTS

[75] Inventors: Jean Beneck, Ormesson; Jean P. Louvat, Velizy Villacoublay; Claude Quayre, Neuilly Plaisance, all of France

[73] Assignee: Framatome, Courbevoie, France

[21] Appl. No.: 901,903

[22] Filed: Aug. 29, 1986

[30] Foreign Application Priority Data

Aug. 29, 1985 [FR] France ............................ 85 12898

[51] Int. Cl.$^4$ ............................................. G21C 19/32
[52] U.S. Cl. .................................. 376/261; 376/272; 29/723
[58] Field of Search ............. 376/261, 272; 29/400 N, 29/723, 426.3; 250/506.1, 507.1; 252/633; 414/146

[56] References Cited

U.S. PATENT DOCUMENTS

| | | | |
|---|---|---|---|
| 3,259,748 | 7/1966 | Lammers | 250/507.1 |
| 4,374,801 | 2/1983 | Albin | 376/271 |
| 4,441,242 | 4/1984 | Hicken et al. | 376/261 |
| 4,446,098 | 5/1984 | Pomaibo et al. | 376/261 |
| 4,474,727 | 10/1984 | Kmonk et al. | 376/272 |
| 4,547,117 | 10/1985 | Shields et al. | 376/261 |
| 4,619,808 | 10/1986 | Formanek | 250/507.1 |

FOREIGN PATENT DOCUMENTS 8304454 12/1983 PCT Int'l. Appl. ................ 376/261

Primary Examiner—Deborah L. Kyle
Assistant Examiner—Daniel Wasil
Attorney, Agent, or Firm—Pollock, Vande Sande & Priddy

[57] ABSTRACT

An apparatus for consolidating the nuclear fuel elements originally arranged in a square pattern into a truss of tightly packed elements comprises a vertical quiver of pyramidal shape having lateral surfaces converging downwardly and a rectangular cross-section. Two opposite faces of the quiver are formed with projections of downwardly increasing amplitude for rearranging the elements in a triangular pattern when they are lowered into the quiver. Dividing walls perpendicular to those faces which are provided with projections separate and guide rows of elements at the top part of the quiver. A grid at the top of the quiver comprises compartments for introducing elements and consists of several fractions which may be moved apart from each other and brought together along a direction parallel to the dividing wall.

10 Claims, 25 Drawing Figures

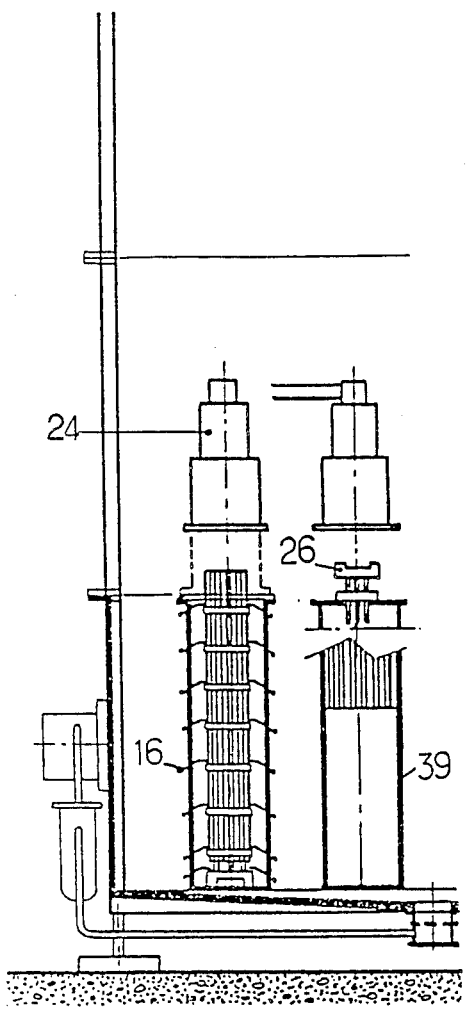
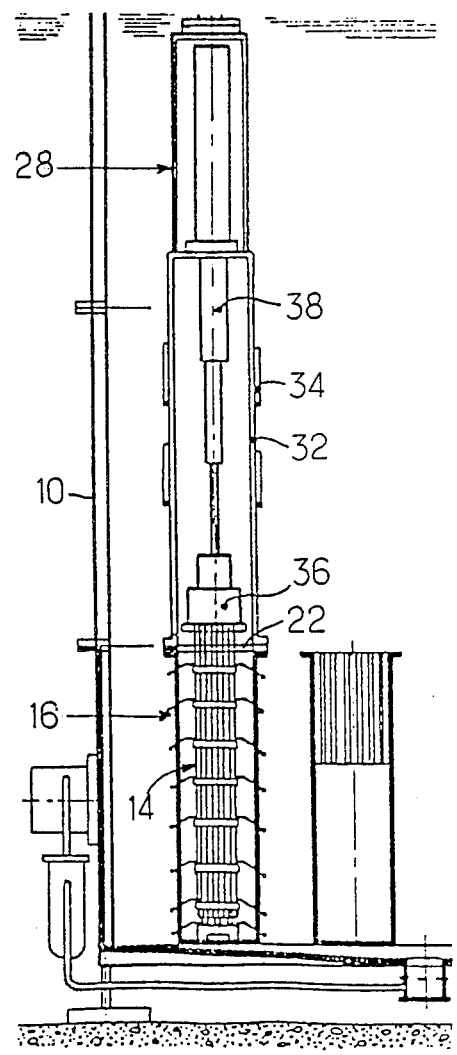
FIG.1A.
FIG.1B.

METHOD AND APPARATUS FOR COMPACTING A BUNDLE OF FUEL ELEMENTS

BACKGROUND OF THE INVENTION

1. Technical Field

The invention relates to compacting or consolidation of a bundle of nuclear fuel elements into a tight array so as to reduce the cross dimension of the bundle with a view to storing same.

2. Prior Art

Spent fuel assemblies removed from a reactor must be stored in a pool until they have been sufficiently deactivated before the fuel elements are reprocessed. It is desirable to reduce the volume occupied by the bundle of fuel elements of an assembly as much as possible so as to increase the storage capacity of the pool. It has been proposed to separate the skeleton from the fuel elements, which form the most radioactive elements, and to form these latter into a compact bundle in which the elements are tightly pressed against each other and distributed in a triangular network.

In most fuel assemblies, particularly in light water reactors, the elements of a fuel assembly are distributed in a square lattice with some fuel elements substituted with elements of a different kind, such as guide tubes belonging to the skeleton of the assembly. It is necessary to remotely extract the fuel elements from the assembly, under water due to their residual activity and due to the release of heat, and to form them into a tight bundle, and then to insert it into a storage case.

Numerous devices have already been proposed for reaching this result and some of them have been constructed. Most of the devices use the fact that, due to their great length and their small diameter, the fuel elements have a sufficient flexibility to bend when passing from one pattern to another. French No. 2,528,218 describes a method which consists in sliding the elements into a compacting device formed of guide tubes located for array transformation and extended by passages defined by longitudinal rods. The reliability of such a system for compacting fuel elements which have been subjected to irradiation may be challenged. In addition, the absence of elements at some locations in the original lattice, where they are replaced by tubes belonging to the skeleton, results in empty spaces in the tight array and discontinuities of support which may cause elements to overlap.

French No. 2,506,993 (U.S. Pat. No. 4,446,098) describes an apparatus comprising several devices brought into play successively and including a compacting device. This latter comprises a vertical quiver in which the elements of a bundle are all inserted at the same time from the top, in successive frames which force them first of all into a rectangular mesh mattice, then into a square lattice with tight spacing, finally into a triangular lattice. The device is made from three sections of approximately pyramidal shape. It is complex and requires forcing the elements to be inserted by means of rollers so as to overcome the resilient resistance to bending offered by the elements.

It is an object of the invention to provide a compacting method and an apparatus which do not subject the elements to flexions which would require high insertion forces; it is a further object to form a "truss" in which the elements are distributed without leaving any empty space in a tight triangular lattice.

To this end, there is provided a method for forming a bundle of fuel elements disposed in a square mesh arrangement, extracted from a fuel assembly, into a tightly packed fuel element bundle with a triangular mesh arrangement, wherein:

(a) all fuel elements are taken simultaneously from the assembly, except those which are placed in lines adjacent those which comprise unoccupied locations of the square lattice, and which are not adjacent an unoccupied location;

(b) the elements removed are lowered into a vertical quiver of pyramidal shape having surfaces converging towards the bottom and the two opposite faces of which have projections for placing the elements in a quincunx arrangement, (c) a plurality of groups of layers of elements are spaced symmetrically apart from each other so as to create free reception spaces, at the top part of the quiver, (d) all the remaining elements are grasped, turned as a whole through 90° and lowered into the free reception spaces between groups of layers (the grasping head having been previously rotated through 90° so as to grasp the remaining elements), (e) and the layers of elements are moved toward each other by moving the quiver along the elements so as to form a compact truss.

The invention also provides a compacting device for implementing the above-defined method comprising: a vertical quiver of pyramidal shape having lateral faces converging towards the bottom and of rectangular cross-section, two opposite faces of the quiver being provided with projections whose height is greater near the bottom so as to change the configuration of fuel elements from a square to a triangular pattern; dividing walls perpendicular to said faces provided with projections, for separating and guiding lines of elements in an upper part of the quiver, defining compartments for introducing elements and formed in several fractions which may be moved apart and toward each other in a direction parallel to the dividing walls.

The invention will be better understood from the following description of embodiments given by way of examples only.

DESCRIPTION OF THE DRAWINGS

FIGS. 1A to 1G show the relative arrangement of the components of FIG. 1 at different steps during implementation of the method;

DETAILED DESCRIPTION OF PREFERRED EMBODIMENTS

Figure 1:
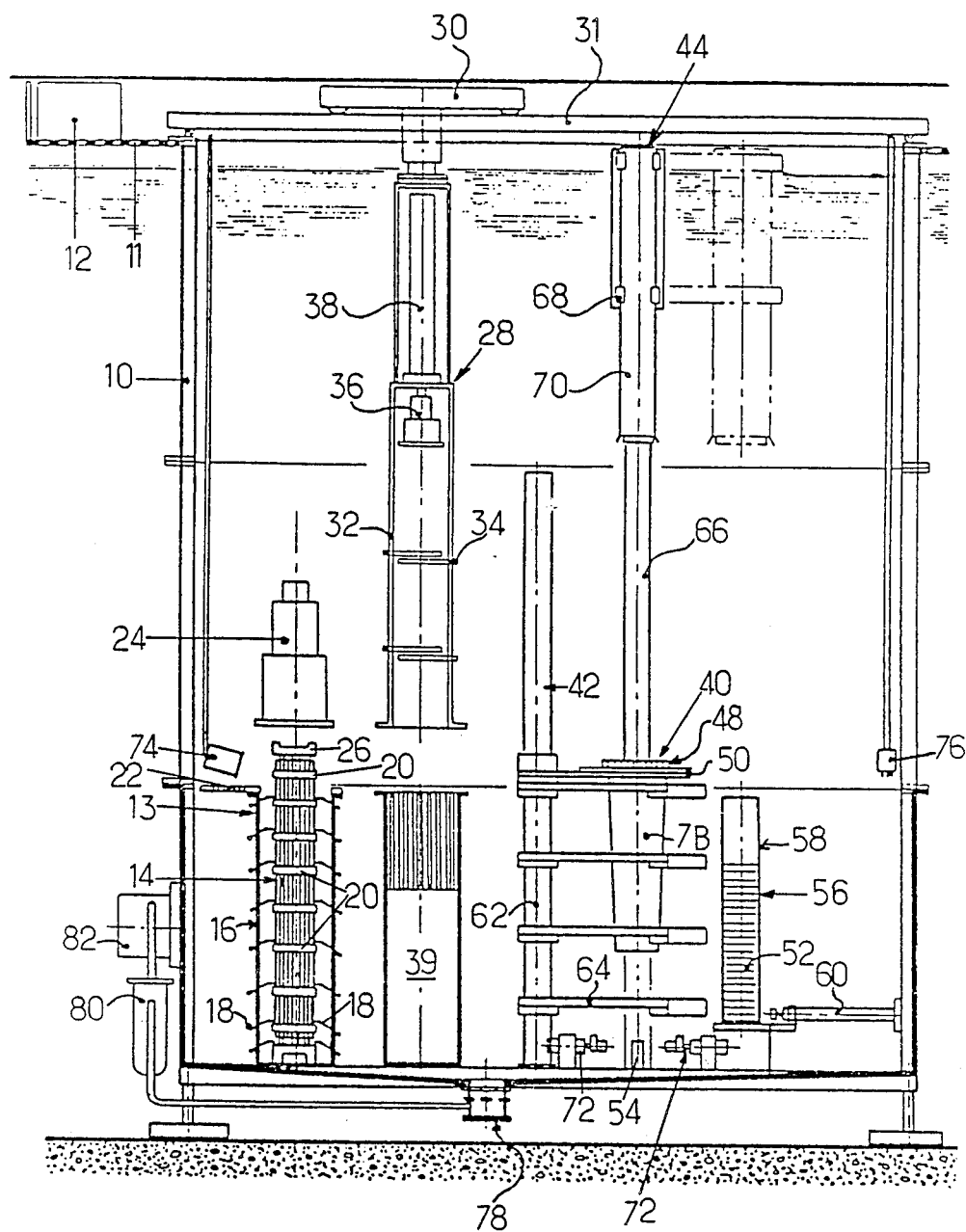
FIG. 1 is a schematical elevational view showing the components of a device of the invention.
Figure 2:
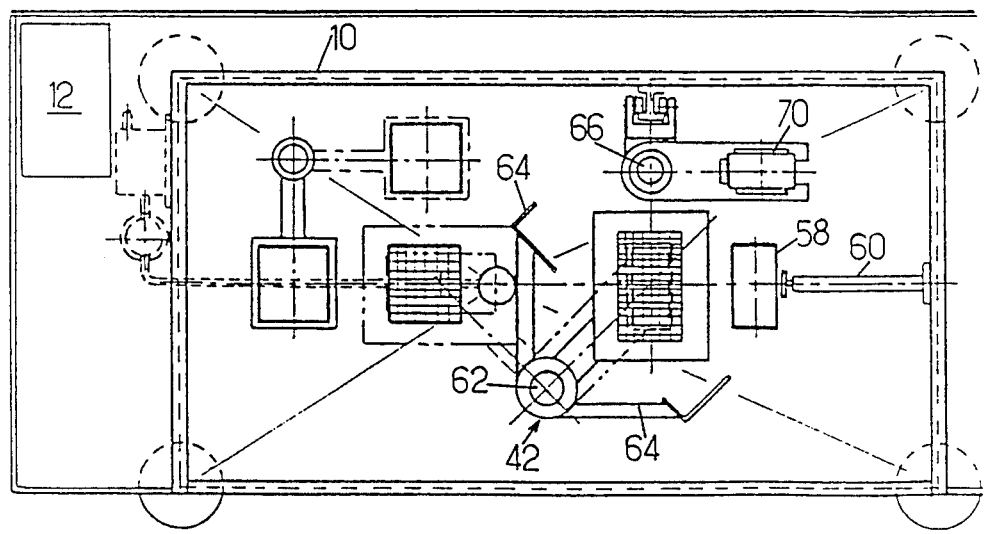
FIG. 2 is a top view of FIG. 1, some components being omitted.

The apparatus shown in FIGS. 1 and 2 may be part of an installation which has a general construction similar to that of known storage stations. At such a station, the elements of an assembly are removed and consolidated as "trusses", the cases containing the trusses are transported to a deactivation and storage place while the skeleton of the assembly is dismantled.

Referring to FIG. 1, the installation is placed in a pool for storing fuel assemblies removed from the core of a reactor. It comprises a main rigid tank structure 10, having a service walk way 11 placed above the water level. The walk way 11 carries a control unit 12 which controls operation of the different components of the installation.

The floor of structure 10 suppports a cell 13 for receiving a fuel assembly 14 to be dismantled. This cell comprises a case 16, claws 18 controlled by a connecting rod mechanism for retaining the grids 20 of assembly 14 and combs 22 maintaining the elements of the fuel assembly at their nominal or set spacing. The combs are typically placed so as to be introduced between the fuel elements under the first grid 20 when they are pivoted about their vertical axis. Actuating cylinders (not shown) are provided for moving the claws and the combs.

The installation comprises several tools movable horizontally and vertically into positions where they work on an assembly 14 placed in cell 13 or on fuel elements.

A first tool 24, which may be of a well known type, is provided for cutting the tie rods which connect the end pieces of fuel assembly 14, just below the end piece 26 placed at the top and for removing the end piece and providing access to the elements of the fuel assembly.

A gripping tool 28, suspended from a carriage 30 which travels over rails 31 carried by the walk way 11, is provided for removing the bundle of fuel elements and handling them. It comprises a framework 32 for vertically guiding the fuel elements, having combs 34 and a gripping head 36 which may be as described in French Pat. No. 2,460,027. Other types of tools may be conceived, based on the general arrangement disclosed in U.S. Pat. No. 281,777. A particular embodiment will be described later. The head 36 is movable vertically in frame 32 by power cylinder 38.

The floor of the structure also supports a storage can 39 for receiving the defective fuel elements.

The apparatus of the invention comprises a consolidation cell 40, a trussing tool 42 and a unit 44 for placing the truss or compacted array in a storage container, which will be described successively.

The consolidation cell 40 comprises a quiver 46 of pyramidal shape having movable grids 48. As shown in FIG. 1, the quiver is carried by a vertically movable support 50. The quiver 46 is open at its bottom end so that the fuel elements which are placed therein can pass therethrough and come into abutment on a detachable bottom wall 52. Successive bottom walls are available from a distributor 56 and may be moved up and down by a jack 54. The distributor comprises a case 58 for storing stacked bottoms and a horizontal actuating cylinder 60 for bringing one bottom at a time onto jack 54. The consolidation cell 40 will be described in detail further on and it will be seen that, due to its shape and design, it gathers together adjacent elements of a bundle into a truss of tightly packed elements.

Referring to FIGS. 1 and 2, the trussing tool 42 comprises a fixed vertical mast 62 which rotatably carries gripper jaws 64. The jaws may rotate between an open position as shown in FIG. 2, and a closed position where they clamp the elements already packed by cell 40. The grippers 64 may thus complete trussing of the elements and hold them during and after upward movement of quiver 46.

Finally, the assembly 44 for placing the truss in a case comprises a fixed vertical mast 66 and a gripper 68 slidably received on the mast for longitudinal and pivotal movement. The gripper 68 is constructed for holding element storage containers 70. In FIG. 2, the gripper is shown in the position shown with broken lines in FIG. 1.

Container 70 is intended to store the fuel elements as a truss, while they are desactivated in a swimming pool, after it has been closed with a bottom wall 52.

The bottom is secured by a mechanism 72, comprising four actuating cylinders which bend the lower edges of the faces of the storage container under the bottom for final closure.

The apparatus further includes ancillary units. As shown in FIG. 1, they comprise observation TV cameras 74; a skeleton handling tool 76; and a waste recovery circuit. The latter comprises an inspection hole 70 at the bottom of structure 10, connected by a pipe to a filter 80 and to a circulating pump 82. Fuel element sections or other loose objects may be recovered via the inspection hole 78.

Figure 3:
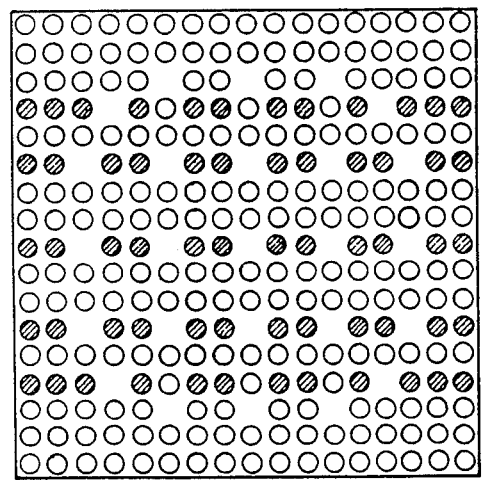
FIG. 3 is a diagram of a typical fuel assembly, as seen from above, showing the distribution of the fuel elements and those of the elements which are removed using a first transfer.

Referring to FIGS. 3-13, a description will be given of parts of an apparatus for processing fuel assemblies whose fuel elements are distributed in a square pattern having 17×17=289 locations or "nodes"; 264 out of 289 nodes are occupied by fuel elements with an arrangement as shown in FIG. 3. However, the invention is much more general in scope and it allows to eliminate the empty locations in the final truss of elements, or at least to reduce them to a minimum, without subjecting the fuel elements during their transfer in any fuel assembly having a rotational symmetry, generally of order 4, to bending forces.

For that purpose, transfer is carried out in at least two successive steps and all elements transferred during the second step are rotated as a whole through 90° before they are inserted between the elements moved during the first step.

Referring to a fuel assembly having 264 fuel elements, the other nodes being occupied by tie rods belonging to the skeleton, the gripping head 36 is constructed to grip only those elements which are not represented with hatched circles in FIG. 3. A head having one of the constructions described in French Nos. 2,506,993 and 2,533,065 already mentioned may be used, however with a suitable arrangement of the active locations.

Figure 4:
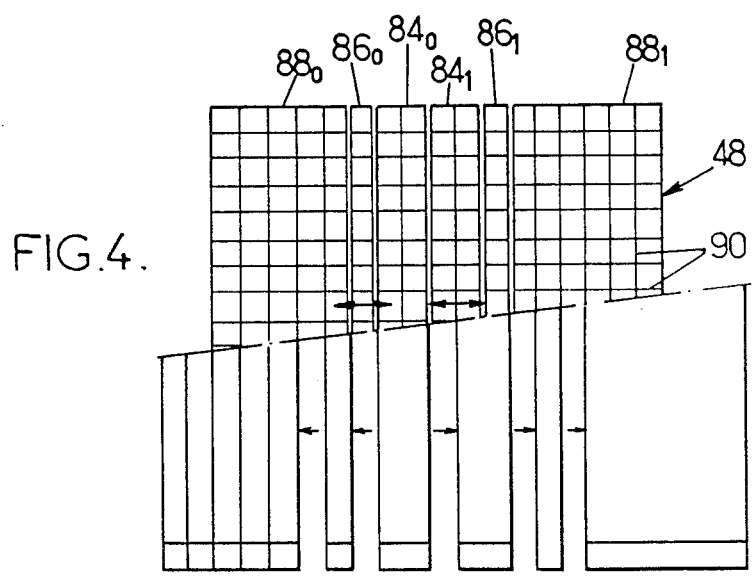
FIGS. 4 and 5 are diagrams as seen from above, of a regrouping cell and a quiver belonging to the device of FIG. 1.

The quiver 46 of cell 40 then has an upper grid 48 as shown in quite simplified form in FIG. 4, in six parts some of which are movable with respect to the others between the tightly packed position shown at the upper part of FIG. 4 and the spaced apart position shown at the lower part. Assuming that part $84_0$ is stationary, the amounts of movement will be:

- one pitch p equal to the spacing between two elements in the fuel assembly for parts $84_1$ and $86_0$ adjacent to part $84_0$;
- two pitches for the parts $86_1$ and $88_0$, symmetrically with respect to $84_0$;
- three pitches for $88_1$.

Each grid comprises crossed plates 90 defining passages each guiding one element.

Figure 5:
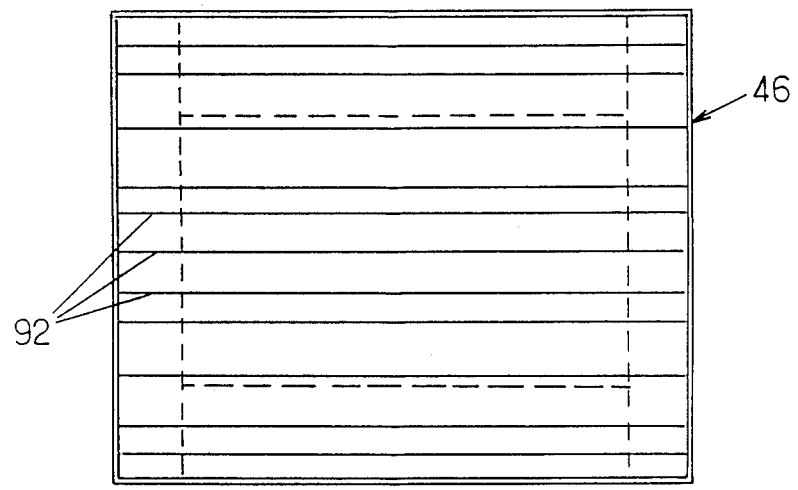
Figure 6:
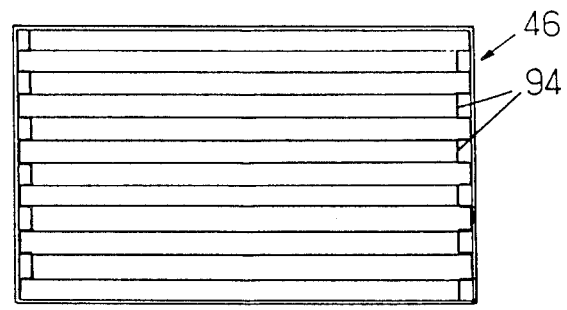
FIG. 6 is a sectional view of the bottom part of the quiver.

Referring to FIG. 5, the quiver 46 comprises, at least in the upper section thereof, dividing walls or partitions 92 for guiding the fuel elements; walls 92 are parallel to the direction of movement of the grids. The quiver has a general frustopyramidal shape with downwardly conveying side faces which bring the elements closer to each other when they are lowered into the quiver. For rearranging the elements from the square pattern in the assembly to a triangular pattern, the lower portions of two faces of the quiver which are perpendicular to the dividing walls 92 are formed with projections 94. As shown in FIG. 6, the projections are of rectangular cross-section. Their depth increases from the upper end to the lower end. Their maximum depth is substantially equal to the half diameter of the elements. The projections and the channels between them rearrange the elements into a quincunx arrangement as they are lowered.

Figure 7:
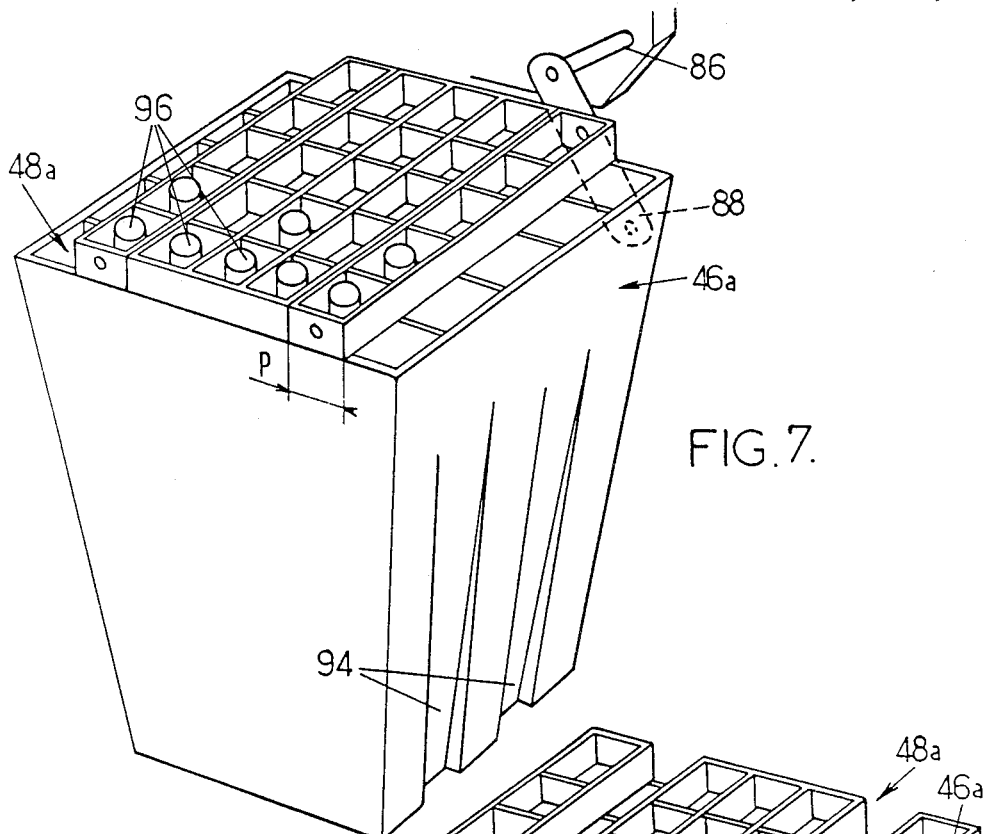
FIGS. 7 and 8 are perspective views of a simplified quiver, whose components are shown in the positions occupied for the first and second element transfer, respectively.
Figure 8:
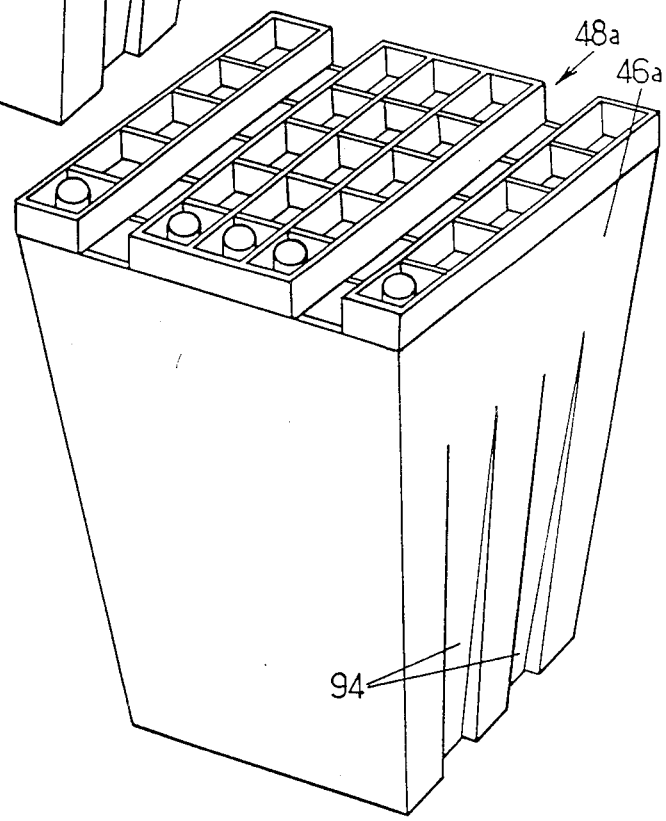
Figure 10:
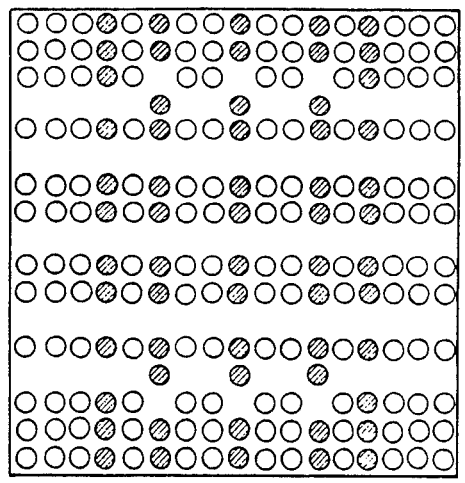
FIG. 10, similar to FIG. 3, shows the arrangement of the elements taken by the grasping head of the device after a 90° rotation and, in thick lines, the elements taken from the assembly by the grasping head during the second transfer.

For a better understanding of the function of the quiver and of the grids, a quiver 46a for receiving a small number of elements has been illustrated in FIGS. 7 and 8, where the scale is not respected: the quiver 46a is arranged to receive 5×5 elements 96. The quiver is formed with channel-type projections 94 whose depth increases downwardly. The parts of grid 48a are shown in FIG. 7 in closed up position. A mechanism, schematized as a cam 86 and two levers 88 (one of which is shown), is actuatable to move the two end parts of grid 48a apart, each by one pitch p, for bringing them into the position shown in FIG. 8.

The operation of the installation will now be explained with reference to FIGS. 1 to 1F.

A spent fuel assembly 14 is brought by handling means of any conventional type into case 16. It is then locked in the case by claws 18 which clamp grids 20. The combs 22 are then rotated by hydraulic cylinders (not shown) and are engaged under the first grid 20 for holding the elements accurately in a regular square lattice.

The cutting tool 24 is then brought above assembly 14 (FIG. 1) then lowered onto the latter. It has cutting blades for shearing the tier ods and a grab for removing the upper end piece 26 and placing it on cell 39 (FIG. 1A).

The cutting tool 24 is removed and the gripping tool 28 supported by carriage 30 is then brought above the fuel assembly 14. Cylinder 38 is actuated for bringing the gripping head 36 of the tool into engagement with the elements, as shown in FIG. 1B. The head 36 may be of the known constructions already mentioned. However, other types may be used. For instance, the head may have three superimposed plates formed with 264 holes and gripping the elements when mutually shifted. Then the head is lowered until the three plates are engaged on the upper part of the element so as to grasp those 204 elements which are not indicated by hatching in FIG. 3.

A preferred embodiment of a head of that type will be described later with reference to FIGS. 16 and 17.

Figure 1C:
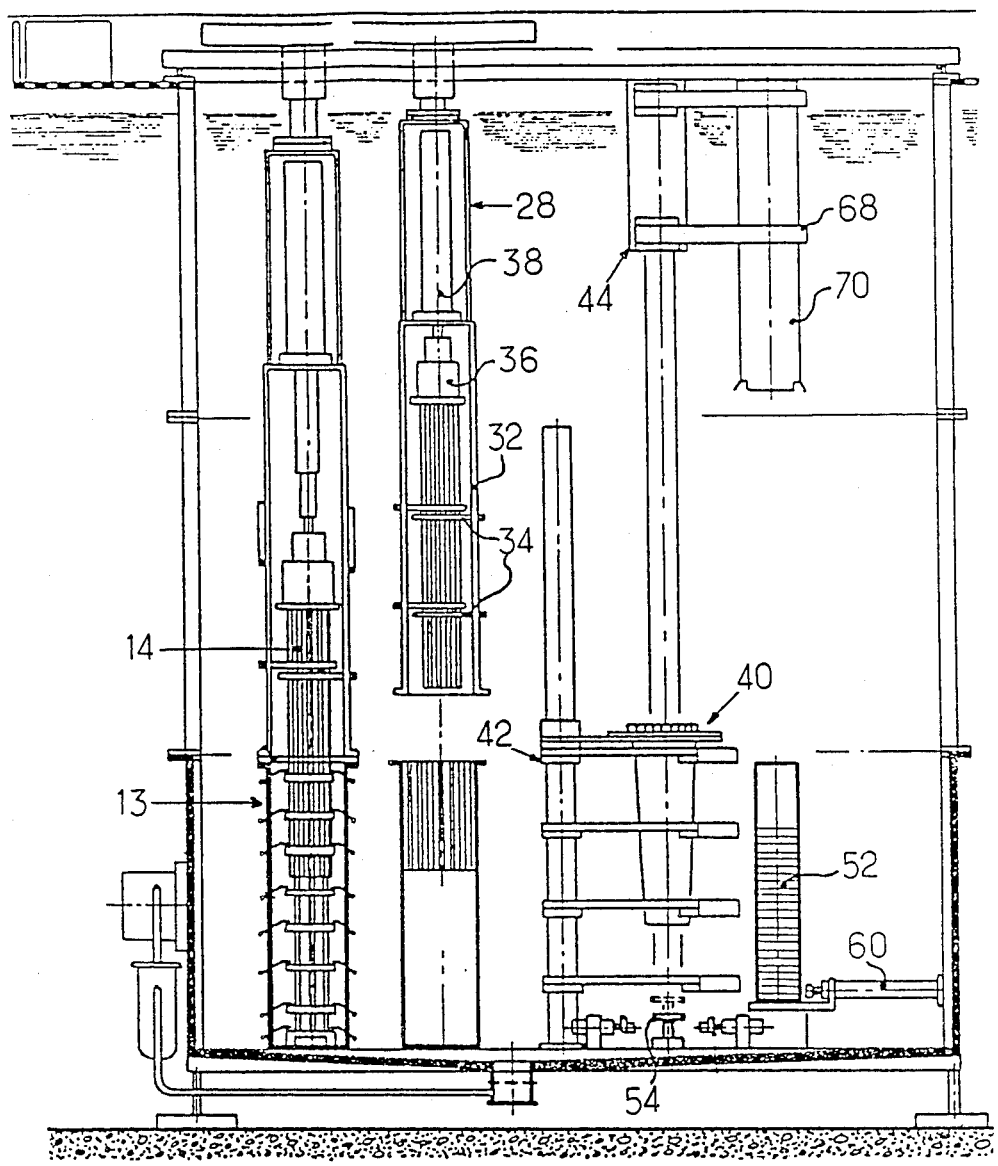

Once the elements have been grasped, the telescopic actuator 38 is again actuated for raising the head and lifting the 204 elements out of the assembly skeleton (FIG. 1C). During removal, the combs 34 retain the elements in a square pattern. During their upward movement, the elements may be inspected, for example with a TV camera 72. If visual inspection shows that some elements are defective, the bundle of 204 elements may temporarily be placed in a cell 39 and then the defective elements are left there while the others are removed. After removal of the 204 elements, the skeleton of this assembly and the sixty elements shown with hatching in FIG. 3 remain in the dismantling case 16 and are still retained at their original locations in the square pattern.

The 204 elements removed are held in proper relative position by the combs 34 of framework 32. They are then brought above the compacting or consolidating cell 40.

Concurrently with that movement, a bottom wall 52 shaped to close the bottom of a storage container is loaded onto support 54. For that, the support is raised into the position shown with a broken line in FIG. 1C and cylinder 60 pushes a bottom 52 onto the support which is then lowered again into its original position, shown in full lines.

The 204 fuel elements removed from the assembly and brought above the regrouping cell 40 are then lowered into the quiver 46 of cell 40. When they enter the quiver, their arrangement is as shown schematically in FIG. 9. As they are lowered, the elements are progressively rearranged into a closer configuration while they remain guided by the separating walls 92 (FIG. 5). They assume, at least in the lower part thereof, the quincunx arrangement imparted by projections 94 (FIG. 6). During the downward insertion, the elements belonging to rows which are cmplete take up, at their lower part which bears on the bottom wall 52, the arrangement which they will retain in the final truss.

The combs 34 are then brought back to a retracted position clear of the elements and the 204 elements are released by head 36. Cylinder 38 raises the gripping head 36: a first transfer of a first batch of elements of the processed assembly is then complete.

For the second transfer of elements, carriage 30 brings back the gripping tool 28 above the dismantling cell 13. Then the gripping head is rotated through 90° about a vertical axis by driving means (not shown). The head is again lowered by cylinder 38 until the plates formed with 264 holes engage on the upper part of the remaining elements. The devices of the gripping head 36 are then actuated and grasp the 60 remaining elements (shown with hatching in FIG. 3). For achieving selective pick up of some only of the elements, some of the holes in the movable plate will be elongated for remaining clear of the elements.

Cylinder 38 is again actuated and raises head 36 to remove the last 60 elements from the assembly which are maintained in proper position by combs 34. Tool 28 is again brought above the compacting cell 40.

Figure 11:
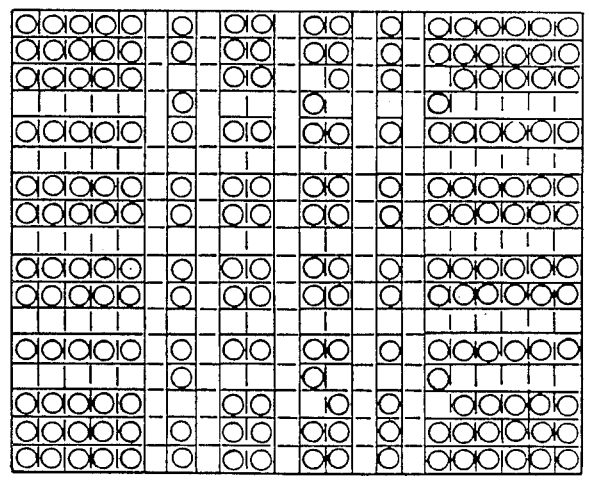
FIGS. 11 and 12, similar to FIG. 9, show the quiver of FIG. 5 with its grids spread apart, after the first and second transfers, respectively.
Figure 12:
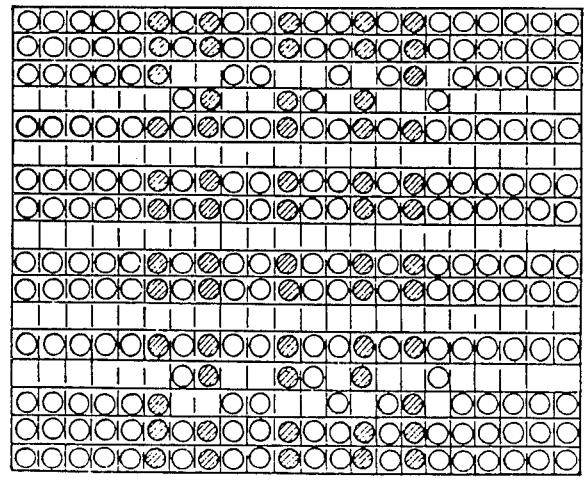
Figure 9:
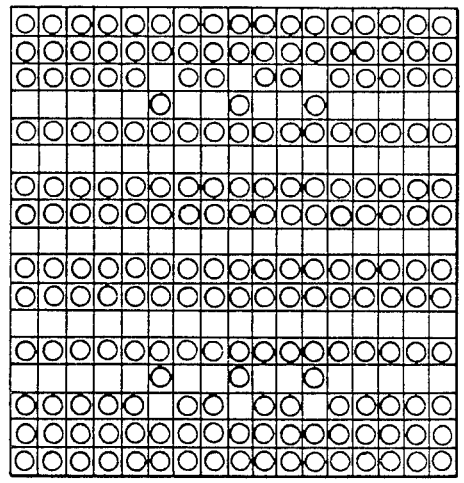
FIG. 9 is a schematical top view showing those elements which are in the quiver of FIG. 5 after the first transfer.

The grids 48 of the quiver are actuated for moving their parts 84–88 to the positions shown in the lower part of FIG. 4. The arrangement of the upper parts of the elements already in the quiver then becomes as shown in FIG. 11. The gripping head 36 is rotated back through 90° and is again lowered. The 60 elements which it carries are inserted into empty locations between the elements already in position and the final arrangement is as shown in FIG. 12 (in which the 60 additional elements have been shown by hatching). Due to the pyramidal shape and geometry of the quiver, the lower parts of all the elements are moved into a tightly packed triangular pattern configuration. It will be appreciated that during the second transfer the empty spaces in the almost complete rows are filled by the few elements which occupy the intermediate rows.

Figure 13:
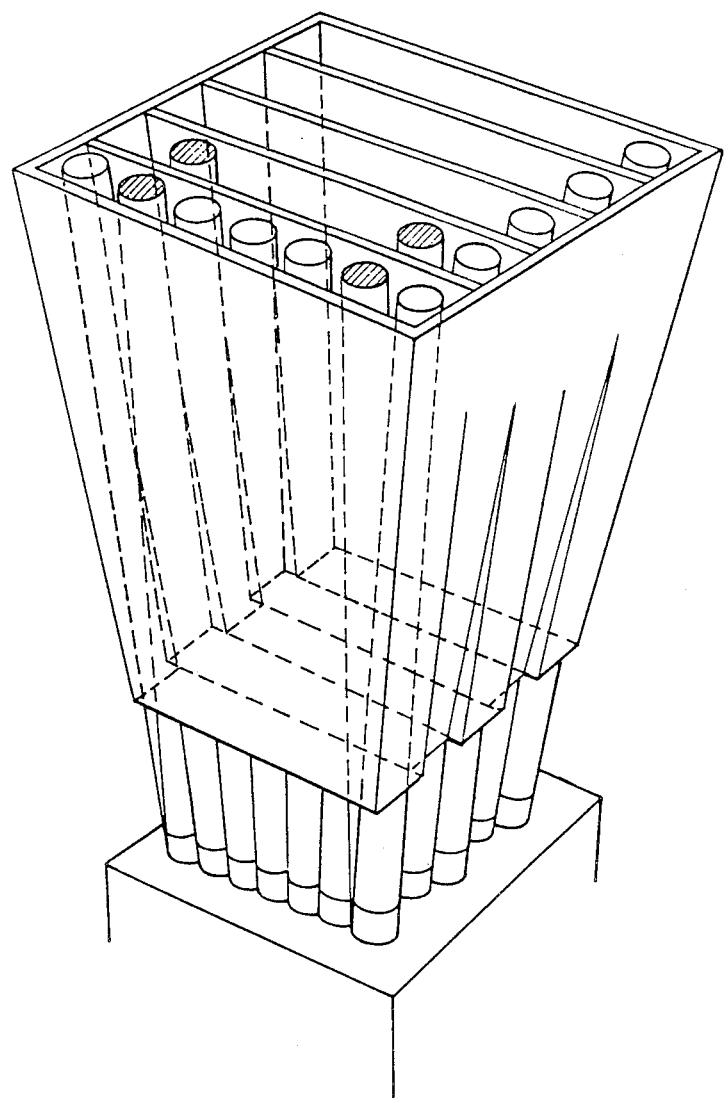
FIG. 13, similar to FIGS. 7 and 8, shows the whole of the elements of the assembly after they have been consolidated.

Referring to FIGS. 7, 8 and 13, the result can be better seen in a simple case. FIG. 7 shows one complete row of elements. FIG. 8 shows the grids moved apart, causing empty locations to appear within the row. FIG. 13 shows inserted elements (in hatching) which will fill the empty spaces after a compacting step which will now be described.

The head of the gripping tool 22 is raised and a trussing tool 42 (FIG. 1D) is used. A lower most set of grippers 64 of that tool 42 is actuated first for grasping the cluster of 264 elements under the quiver. The quiver 46 is then raised slowly for example by means of a winck. During the rising movement, for instance at a speed of 0.1 m/s, the quiver 46 is guided by the mast of tool 42. The truss of elements, placed on bottom wall 52, is held during this time by the lowermost set of grippers 64. As the quiver 46 is lifted, the intermediate set of grippers, then the upper set of grippers, are closed to clamp and grasp the truss of elements while maintaining the geometrical arrangement of the fuel element and progressively pressing the elements against each other to form an array of compacted fuel elements.

Figure 1D:
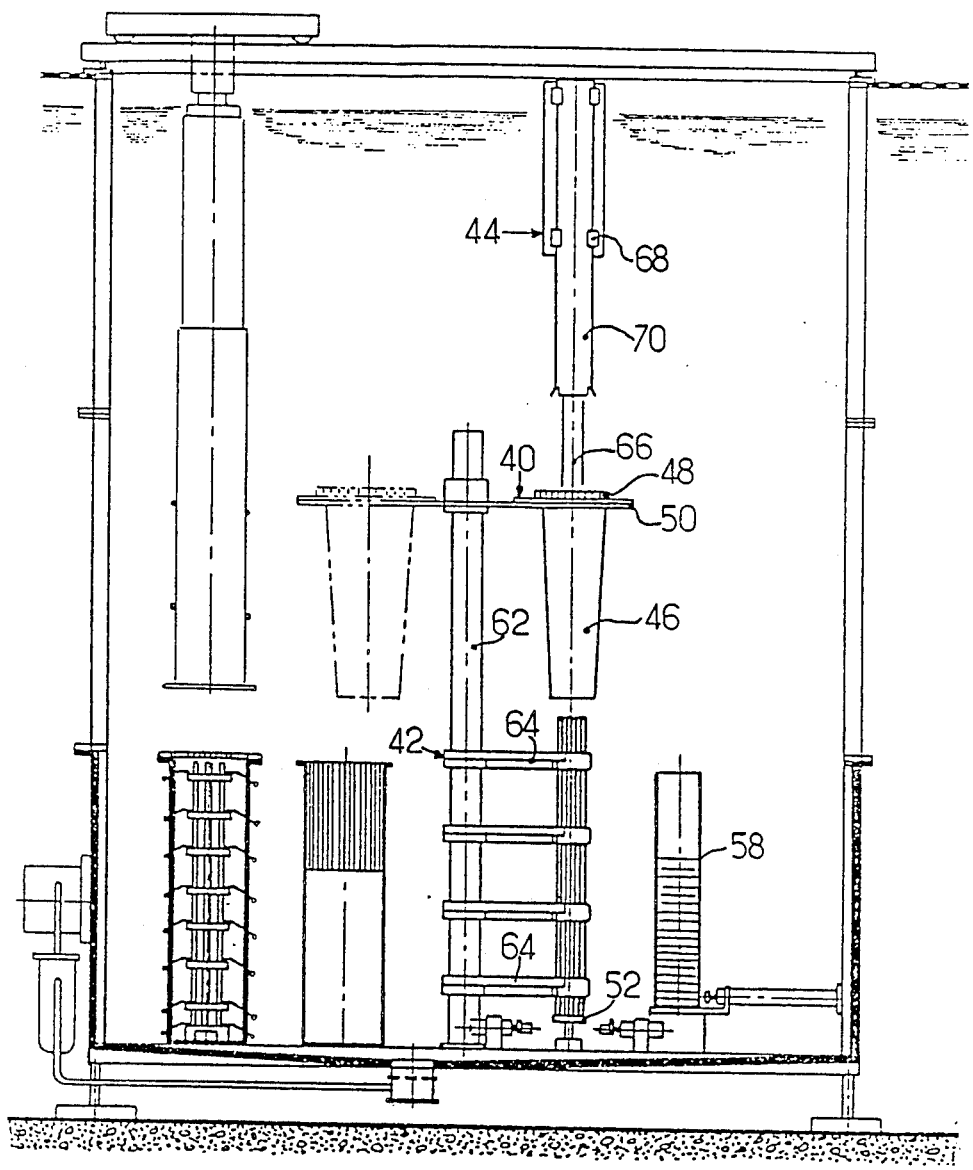
Figure 1F:
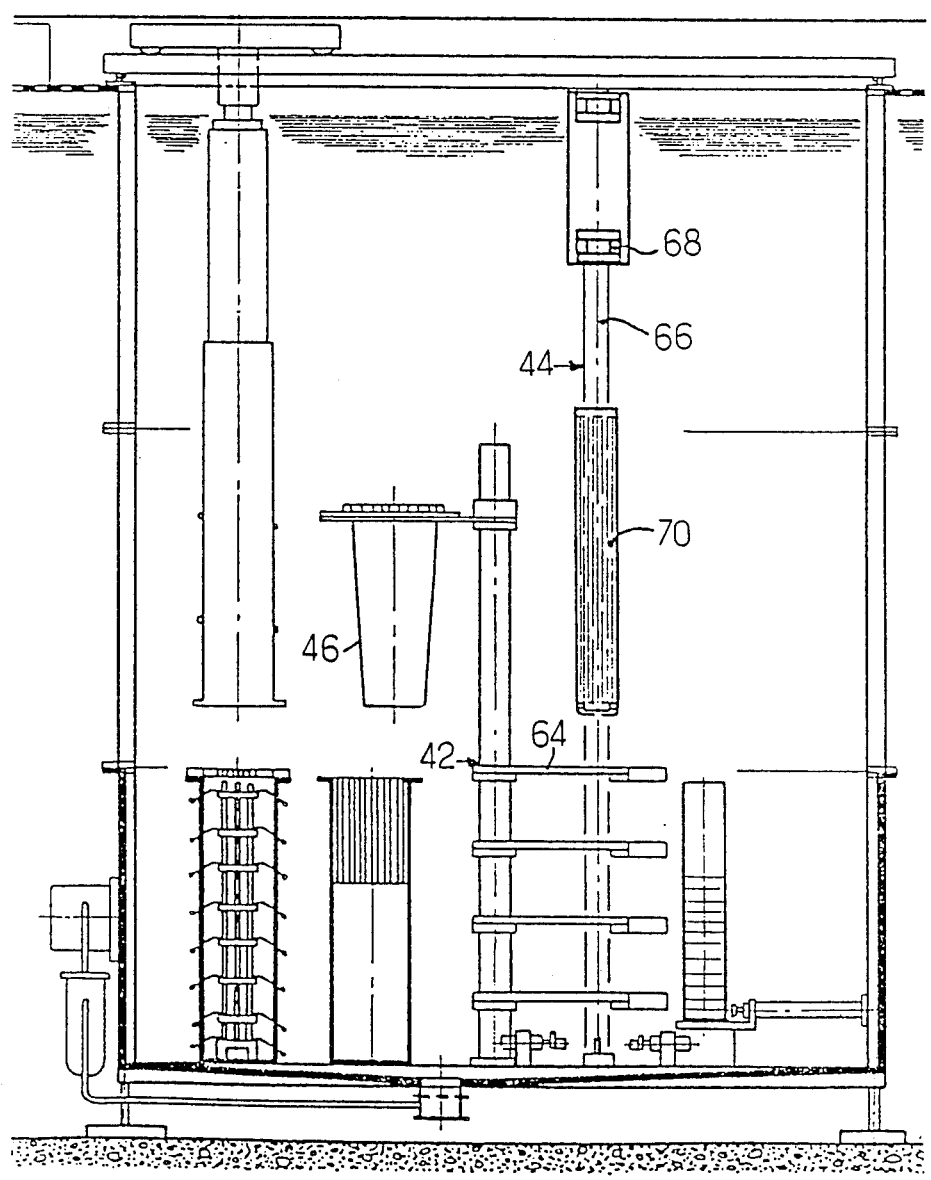

After this step is completed, the arrangement is as shown in FIG. 1D. The quiver is then moved horizontally so as to clear the access for a final storage container 70. The quiver may for instance be removed by rotating its support 50 through 180° so as to bring it into the position shown in broken line in FIG. 1D.

A unit 44 for placing the compacted array in the container is then used. The storage container 70, up to then held vertically in a higher offset position by mast 66 and the gripper 68 (FIG. 1C), is moved to a position above the truss of elements by rotating the gripper 68 about the mast. The container has an open flaring lower part. It is lowered along the mast by a motor (not shown) and encircles the upper part of the truss of elements. As the truss engages into container 70, the upper, intermediate and lower grippers 64 are successively actuated for releasing the truss and clearing the container path. The storage container 70 finally surrounds the truss completely and extends beyond bottom 52 (FIG. 1E). Then the motor cylinders 72 (FIG. 1) are energized for folding the endmost part of the walls of container 70 under bottom 52 and closing the container. The storage case may then be removed from the main structure 10 by a conventional handling apparatus (FIG. 1F).

Figure 1G:
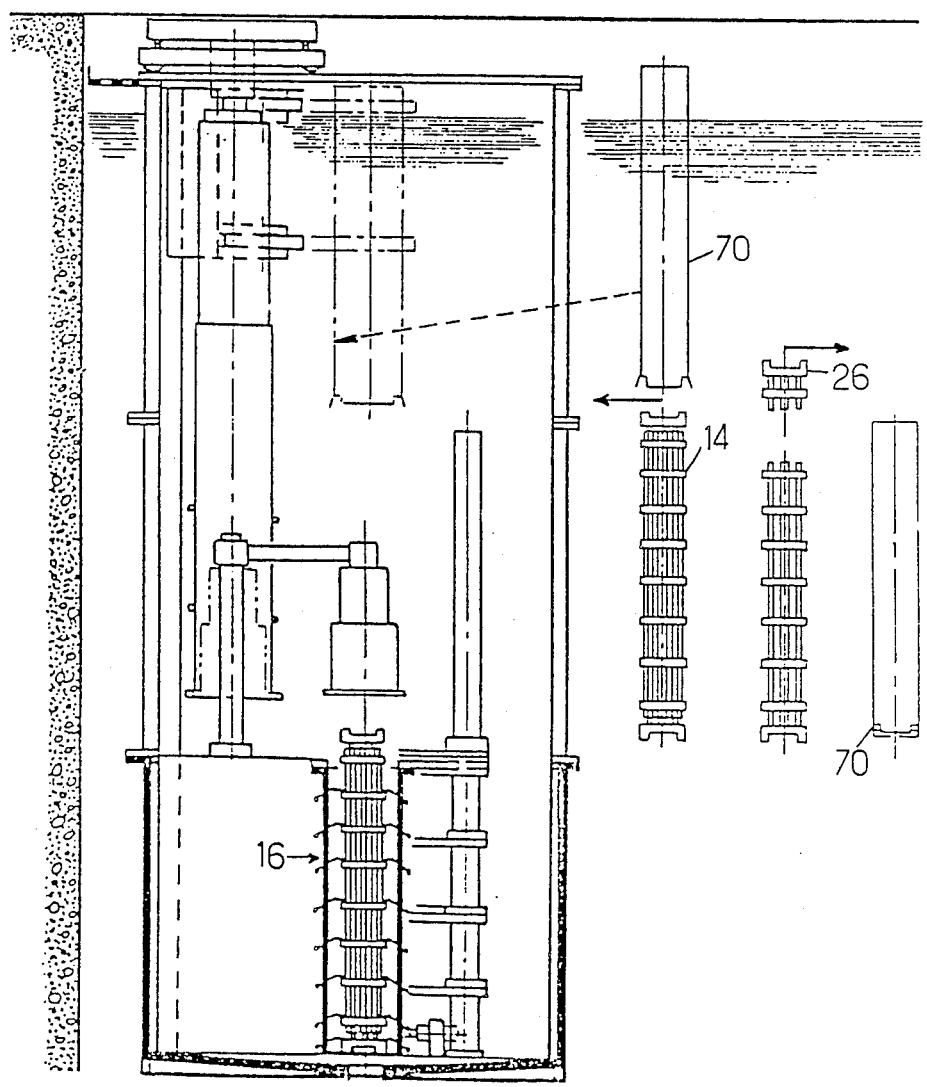
Figure 1E:
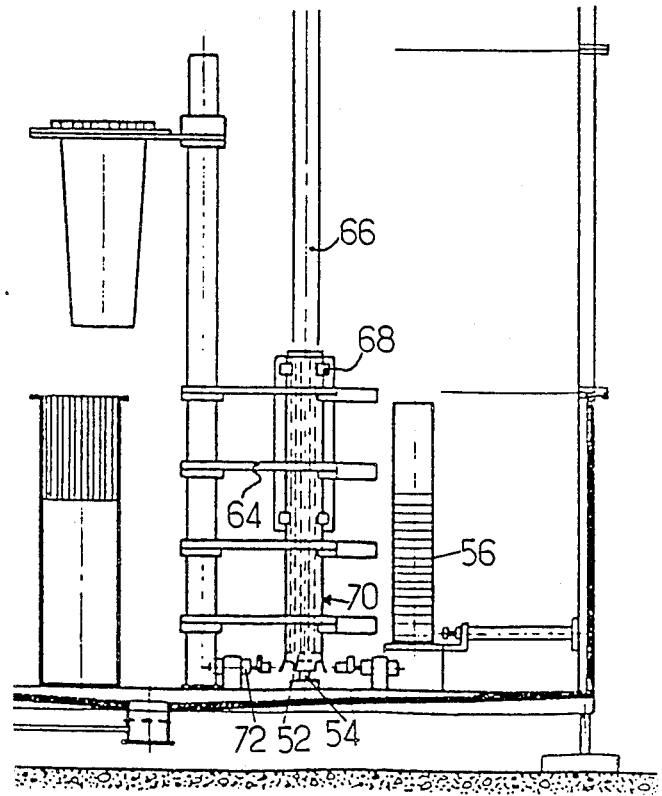

Finally, after the container 70 has been removed and after the upper end piece of the dismantled fuel assembly 26 and the residual skeleton have been removed to a storage place, a new assembly is placed in the dismantling case 16 and a new storage container 70 is brought into position (FIG. 1G). The operation may then be repeated on the new assembly.

Figure 16:
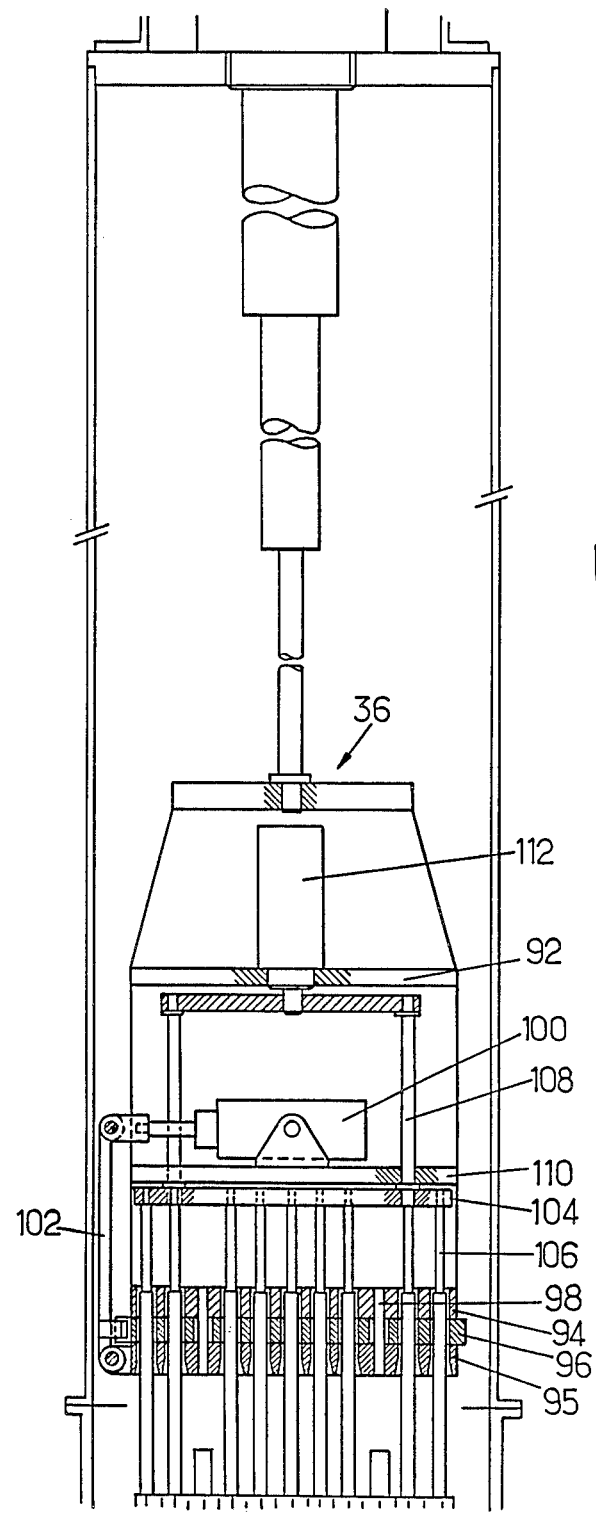
FIG. 16 is an elevation view in partial cross-section of a gripping head for use in the apparatus.

Referring to FIG. 16, a head with three superimposed plates will now be described.

The head 36 has a body 92 and upper and lower guide plates 94 and 95 secured to the body. A slider, horizontally movable with respect to the body, i.e. transversely to the direction of the fuel elements, comprises a locking plate 96 located between the guide plates. Locking plate is guided by spacers 98 connecting the guide plates. A mechanism for moving the locking plate comprises a fluide pressure cylinder 100 and a mechanical linkage 102. An ejector is carried by the body for longitudinal movement and has a support plate 104 and ejector pins 106. The ejector is connected to the piston of a driving cylinder 112 by rods 108 slidably received in a guide plate secured to the body.

Operation is as follows: transversal movement of locking plate 96 from its rest position due to energization of fluid pressure cylinder 100 locks those elements which project through the guiding plates 94 and 95. Then the head may be lifted for extracting the fuel elements, then moved horizontally to bring the elements above quiver 46. Then they may be released by deenergizing cylinder 100. Actuation of cylinder 112 causes the pins to move into the openings of the plates and to force out the elements if necessary.

Figure 17:
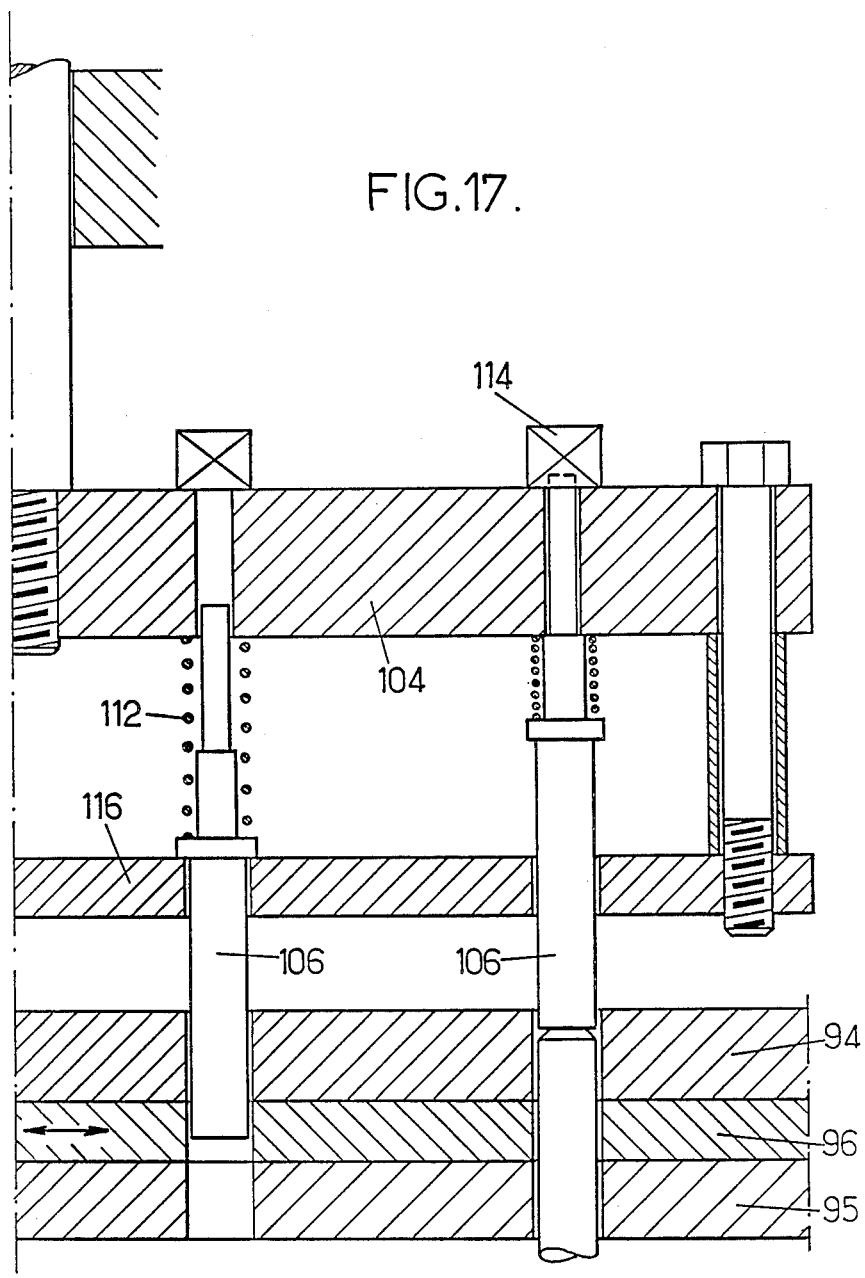
FIG. 17 is a detail view on an enlarged scale illustrating a modification of FIG. 16, the head being inserted on fuel elements.

In the embodiment of FIG. 17, the ejection pins 106 are slidably received in plate 104 rather than secured thereto. They are movable between a rest position to which they are biased by individual springs 112, as shown in the left hand aprt of FIG. 17, and an active position (right hand part) into which they are forced by the respective elements. The rest position is determined by an abutment plate 116 secured to plate 104 and traversed by the pins. In the active position, the pins actuate individual sensors 114 carried by plate 104. It is consequently possible to determine whether all elements to be removed have actually been seized.

Figure 14:
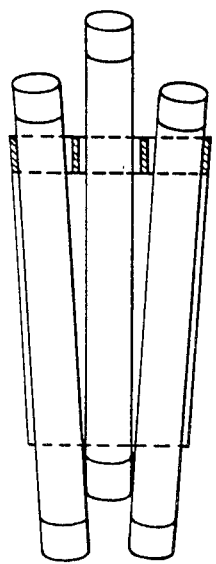
FIGS. 14 and 15 show two possible quincunx arrangements of the elements in the quiver.
Figure 15:
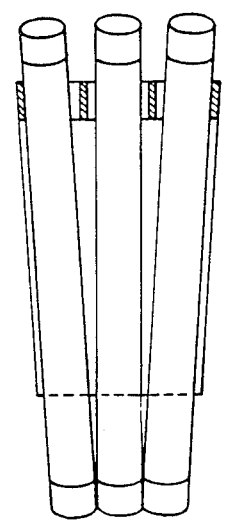

Numerous modifications are possible. Instead of using a quiver which brings all the elements to the same horizontal level, as shown schematically in FIG. 15, it is possible to provide a slight vertical offset, as shown in FIG. 14, which is slightly more favorable. In still another embodiment, sets of two quivers having an overall cross-section substantially identical to that of a fuel assembly are used. Each set may then be stored in a location of the racks provided for fuel assemblies in a deactivation pool.

We claim:

1. A method of remotely compacting a bundle of nuclear fuel elements originally disposed as rows in a square lattice within a fuel assembly into a packed array of fuel elements in a triangular array configuration, comprising the steps of:
   (a) withdrawing a first of two group of said fuel elements simultaneously from the assembly
   (b) lowering the elements withdrawn during step (a) into a vertical compacting chamber of pyramidal shape having sides converging downwardly, the two opposite ones of said sides having projections arranged for changing the configuration of the elements into a quincunx configuration, (c) separating a plurality of groups of rows of said first group of lowered elements symmetrically from each other at the upper part of the compacting chamber so as to create empty locations, (d) withdrawing the other group of said fuel elements, rotating them as a whole through 90° about a vertical axis and lowering them into the empty locations between said groups of rows, (e) and compacting all of said two groups of elements into a triangular array throughout their length by moving them downwardly out of the compacting chamber.

2. A nuclear fuel element compacting apparatus for consolidating a bundle of fuel elements originally disposed in a square lattice arrangement as a packed array of elements in a triangular lattice, comprising: a compacting chamber of pyramidal shape having faces converging downwardly and of rectangular cross-section, two opposite of said faces of the compacting chamber being formed with projections whose depth is greater near the bottom so as to change the configuration of fuel elements from a square to a triangular pattern; dividing walls situated within said compacting chamber, perpendicular to said faces provided with projections, for separating and guiding lines of elements in an upper part of the compacting chamber, and grid means situated at the top part of the compacting chamber defining compartments for introducing elements into said compacting chamber and formed in several movable fractions which may be moved apart and toward each other in a direction parallel to the dividing walls.

3. Apparatus according to claim 2, wherein said compacting chamber is part of a compacting cell further comprising means for vertically moving the compacting chamber between a lower position, above a bottom wall for receiving said elements, and an upper position for releasing said elements on the bottom.

4. Apparatus according to claim 3, further comprising a trussing tool having grippers disposed at a plurality of different horizontal levels, movable between a spaced apart position in which they release said elements and a closed up position in which they hold the elements as a tightly packed array.

5. Apparatus according to claim 4, further comprising a unit for placing the array in a container having means for moving one container having an open bottom vertically to a position over the array and means for folding the lower endmost parts of walls of the storage container case under said bottom wall supporting the array.

6. Apparatus according to claim 5, further comprising means for bringing one bottom at a time onto a support situated under the compacting chamber and at a vertical distance therefrom.

7. Apparatus according to claim 2, further comprising a gripping tool movable horizontally between a position situated above a case for demounting an assembly to be dismantled and a position situated above the compacting chamber, said tool comprising a gripping head for taking several elements at a time from the demounting case and means for vertically moving said head so as to raise the elements out of the demounting case and inserting them into the compacting chamber through the grid thereof.

8. Apparatus according to claim 7, wherein said head comprises means for simultaneously grasping all elements in the assembly except for elements placed in rows adjacent those rows which comprise empty locations in the assembly and which are not adjacent an empty location.

9. Apparatus according to claim 8, wherein the gripping tool comprises means for rotating the gripping head through 90° so as to grasp the elements remaining in the assembly after a first removal operation.

10. Apparatus according to claim 9, for processing a fuel assembly comprising a lattice with $17 \times 17$ nodes 264 of which are occupied by fuel elements, wherein the gripping head is provided for grasping 204 elements during the first transfer and 60 elements during the second.

* * * * *